UNITED STATES PATENT OFFICE.

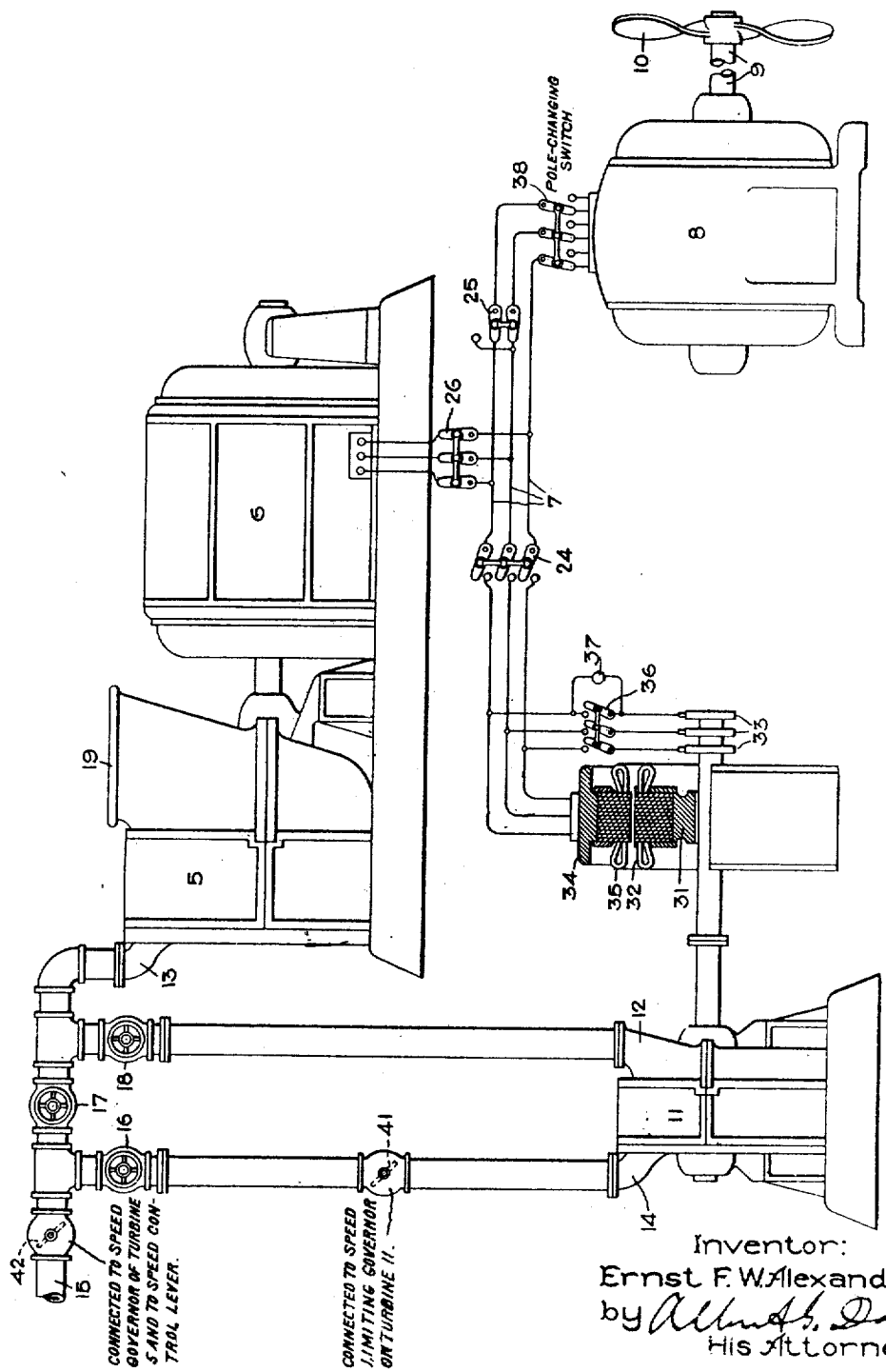

ERNST F. W. ALEXANDERSON, OF SCHENECTADY, NEW YORK, ASSIGNOR TO GENERAL ELECTRIC COMPANY, A CORPORATION OF NEW YORK.

ELECTRIC SYSTEM OF SHIP PROPULSION.

1,304,240.  Specification of Letters Patent.  Patented May 20, 1919.

Application filed March 22, 1916. Serial No. 86,013.

*To all whom it may concern:*

Be it known that I, ERNST F. W. ALEXANDERSON, a citizen of the United States, residing at Schenectady, county of Schenectady, State of New York, have invented certain new and useful Improvements in Electric Systems of Ship Propulsion, of which the following is a specification.

My invention relates to ship propulsion and particularly to systems of ship propulsion in which the ship's propellers are driven by electric motors. The object of the invention is to provide an improved electric system of ship propulsion. Other objects of the invention will be particularly pointed out in the course of the following description.

The system of my present invention is particularly adapted for equipments in which it is necessary that the propelling apparatus operate economically at two different speed ranges. Take, for example, the case of a battleship, where high efficiency at a high range of speeds and at a lower range of speeds is particularly essential, and in fact practically necessary. In such ships, economic operation of the propelling apparatus must be obtained over the desired range of high speeds, including full speed, and also over a suitable range of lower speeds, which I will term the cruising speeds. The present invention more particularly relates to electric systems of ship propulsion in which electric energy is supplied to propeller-driving induction motors by turbine-driven alternators. Speed variations of a ship propelled by such a system can be obtained by varying the admission of operating fluid to the turbines, but efficient operation over such a wide range of speeds as would include both the high and cruising speeds of the ship can not be satisfactorily obtained merely by varying the steam admission to the turbines, since if a turbine is designed and proportioned for high efficiency at its high speeds, its efficiency will be much poorer at the relatively low speeds corresponding to the cruising speeds of the ship.

The power required to propel a vessel varies approximately as the cube of her speed, and, accordingly, at cruising speeds considerably less than the maximum power of the propelling equipment is required for driving the ship, and greater economy could be obtained by using a small high pressure turbine operating at a higher speed in series with the main turbine, which in such a case would be used as a low pressure turbine. The difficulty in practically employing such a system lies in the fact that the full speed of the main turbine is such that a two-pole generator must be used, and, therefore, it is not possible to use a generator of the ordinary kind with the high pressure cruising turbine, since the speed of the latter should be higher than that of the main turbine for this condition of operation. William L. R. Emmet has described in an application for Letters Patent of the United States, Serial No. 84,490, filed March 15, 1916, an arrangement of apparatus by which two turbines operating in series can be operatively connected to two electric generators so that the latter may operate in parallel to supply electric energy to a propeller-driving induction motor. In its complete form the Emmet arrangement comprises a synchronous generator and an induction generator so connected to the main and cruising turbines that a relation is established between the turbines whereby the auxiliary turbine can operate at a higher speed than the main turbine and at the same time the two generators can be electrically connected to supply energy in parallel to the propeller-driving induction motor. If in the Emmet arrangement the induction generator is mechanically independent of the main turbine and is driven solely by the auxiliary turbine, speed-reducing gearing must be interposed between the auxiliary turbine and the induction generator. The particular aim of my present invention is to provide an improved system of this general character in which the two generators can be directly coupled to their respective prime movers, and still more particularly the aim of my present invention is to enable the use of two direct-connected turbo-generators of the synchronous type in a system of this character, and to this end I propose to employ an ordinary synchronous generator and a double synchronous generator in place of the synchronous and induction generators, respectively, of the Emmet arrangement.

The novel features which I believe to be patentably characteristic of my invention are definitely pointed out in the claims appended hereto. The arrangement of the apparatus in and the mode of operation of the system of my present invention will be best understood from the following description taken in conjunction with the accompanying drawing, in which:

The figure diagrammatically represents an electric system of ship propulsion embodying my present invention.

In the drawings there is diagrammatically represented a main elastic-fluid turbine 5 designed for high efficiency as a high-speed high-pressure machine and adapted for economic operation at lower speeds when supplied with elastic-fluid of lower pressure. The main turbine is directly coupled to an alternating current generator 6. The generator 6 is preferably a polyphase synchronous alternator of the revolving field type. The generator 6 is electrically connected by means of leads 7 to a polyphase induction motor 8. The rotor of the induction motor is mounted on a propeller shaft 9, carrying a propeller 10.

An auxiliary or cruising turbine 11, designed for high efficiency as a high-speed high-pressure machine, has its exhaust 12 connected to the admission 13 of the main turbine 5. The admission 14 of the auxiliary turbine is connected to the main supply pipe 15 communicating with a suitable source of elastic fluid, such, for example, as the steam boilers of the ship. The main supply pipe 15 is also in communication with the admission 13 of the main turbine 5. Three valves 16, 17 and 18 are shown for controlling the steam admission to the turbines 5 and 11. When valves 16 and 18 are closed and valve 17 open, the main turbine 5 receives steam directly from the boilers and its exhaust 19 may be connected to a suitable condenser, as well understood. Under this condition of operation the main turbine will run at high speeds with high efficiency, and variations of the ship's speed over the high-speed range can be obtained by varying the steam admission to the turbine, whereby the speed of the turbine and accordingly the frequency of the alternating current energy delivered to the propeller-driving induction motors are correspondingly varied.

The rotor of the auxiliary turbine 11 is directly coupled to the rotor 31 of a double-synchronous generator. The rotor 31 carries a polyphase field winding 32 connected to slip rings 33. The stator 34 of the double-synchronous generator carries a polyphase armature winding 35 which is substantially a counterpart of the polyphase field winding 32. The armature and field windings 35 and 32 are designed to be connected in parallel by means of a synchronizing switch 36 and to the leads 7 by means of a switch 24. When the field winding 32 is excited with alternating current a rotating magnetic field is produced, and if under such circumstances the rotor 31 is driven at twice synchronous speed with reference to the frequency of the exciting current, an alternating current of the same frequency as the exciting current will be induced in the armature winding 35. In other words since the field of the generator is itself rotating at synchronous speed the field magnet structure must be rotated at double synchronous speed.

The propeller-driving induction motor 8 is mechanically independent of the main and auxiliary turbines, wherefore the propeller 10 is driven by a torque developed entirely by this motor. It will of course be understood that more than one propeller-driving motor may be coupled to each propeller shaft. A reversing switch 25 is provided for reversing the direction of rotation of the propeller-driving motor, and a switch 26 is included in the equipment for electrically connecting the synchronous generator 6 to the mains 7.

The operation of the system is as follows: For the higher range of speeds, the switch 24 is open and switch 26 is closed, whereby the induction motor 8 is electrically connected to the main generator 6. Valves 16 and 18 are closed while valve 17 is open, thereby admitting high-pressure steam to the main turbine 5. The main turbine 5 and generator 6 thus run at their respective high speeds and the frequency of the alternating current energy delivered by the generator 6 to the induction motor 8 is such as to produce the proper propeller speed for high speed navigation of the ship. During this condition of operation the auxiliary turbine 11 and the double-synchronous generator are operatively inactive and remain at rest. Speed variations of the propeller and hence of the ship for this condition of operation can be obtained by controlling the admission of steam to the turbine 5, and for this purpose a valve 42 is included in the main supply pipe 15. The valve 42 is designed to be operatively connected to a speed governor on the main turbine 5 and to a suitable speed control lever, substantially as described in United States Letters Patent granted to W. L. R. Emmet, No. 1,137,308, dated April 27, 1915.

For the navigation of the ship at the lower range of speeds, such as her cruising speeds, the two turbines are connected in series. This condition of operation is obtained by closing the switch 24 and valve 17, and opening valves 16 and 18, whereby the two generators are electrically connected together and high pressure steam is admitted directly to the cruising turbine 11, while the main turbine 5 operates with exhaust steam received from the cruising turbine. The relative speeds of the turbines 5 and 11 will depend upon the electrical design of the generators, and in particular upon the ratio of their pole numbers. In order to establish this speed relation between the turbines the two generators must be synchronized, and this can be done by bringing the double-synchronous generator up to a speed slightly higher than double synchronism and then permitting this generator to slow down. When the speed of the double-synchronous generator falls to double synchronism the field synchronizing switch 36 can be closed and the two generators will fall into step and will thereupon definitely establish the relative speeds of the turbines. Any suitable synchronism indicator, such as the lamp 37, may be shunted around the synchronizing switch 36. During the act of synchronizing, the main turbine 5 will be loaded to a greater or less extent, while the cruising turbine 11 will be running light, and thus no difficulty will be encountered in bringing the crusing turbine up to a speed slightly greater than double synchronism. It will thus be evident that the synchronous and double-synchronous generators establish a relation between the main and cruising turbines such that the latter can run at double synchronous speed while the former runs at synchronous speed, and at the same time the two generators are operating in parallel to supply electric energy to the propeller-driving motor or motors. When the double-synchronous generator falls into step at double synchronism with the synchronous generator 6, the two generators become electrically locked in step, as well understood in the art, and a definite speed relation between the two turbines is thereby established and maintained within the limits of the electro-dynamic capacity of the two generators.

For the purposes of explanation I will assume that the full speed of the main turbine 5 is 2200 R. P. M., and that this speed of the main turbine will drive the ship at 35 knots per hour. I will also assume that the full speed of the cruising turbine 11 is 3600 R. P. M., so that when the cruising and main turbines are connected in series the speed of the main turbine will be 1800 R. P. M., assuming the generators to be bi-polar. For speeds between 35 and about 28 knots the main turbine will be operated alone, and speed variations over this speed range can be obtained by varying the steam admission to the turbine. For speeds below about 28 knots the two turbines will be connected in series and the two generators will supply electric energy in parallel to the propeller-driving motor or motors. Variations in speed for this arrangement of the apparatus will be obtained by varying the admission of live steam to the crusing turbine. If a still lower range of speeds is necessary the motor 8 can be provided with a primary winding adapted to produce primary magnetic poles of different pole numbers. Any suitable arrangement of the primary winding for pole-changing can be employed, and I have shown in the accompanying drawing a pole-changing switch 38 for this purpose. Thus for speeds below about 22 knots the pole-changing switch 38 will be moved to its low-speed position, whereby the primary winding of the motor 8 is arranged to produce its higher number of primary poles. Where such large speed variations are not necessary, economical operation over a reasonable range of speeds can be obtained by using the main turbine alone at the higher speeds, and the two turbines in series and the generators in parallel at the lower speeds with only one pole combination of the propeller-driving motors.

The auxiliary turbine 11 has a speed-limiting device or governor operatively connected to a valve 41 in the steam supply pipe thereof. The governor and valve are designed to limit the speed of the turbine 11, so as to prevent the speed of this turbine rising above a predetermined value. The governor and valve 41 may advantageously be of that type described in the United States Letters Patent of W. L. R. Emmet, No. 1,137,593, dated April 27, 1915.

The double-synchronous generator has a very special usefulness in a system of the character herein described. As previously mentioned, in order to get proper motor conditions in ship propulsion, it is generally necessary to use a low electrical frequency, and such low frequency makes difficult the application of a cruising turbine of sufficiently high speed. The double-synchronous generator enables the use of the advantageous high-speed cruising turbine without necessitating speed reducing gearing and clutches, both of which devices are more or less objectionable for such purposes. Furthermore, the double-synchronous generator is of relatively small size, and since its magnetization is furnished by the main generator no additional exciters are needed. Another particular advantage of this arrangement is that such a cruising turbine and double-synchronous generator combination can be used in connection with any one of a plurality of main turbine generating units.

What I claim as new and desire to secure by Letters Patent of the United States, is,—

1. An electric system of ship propulsion comprising a main elastic-fluid turbine, a synchronous alternator coupled to said turbine, an auxiliary elastic-fluid turbine, means for supplying the exhaust fluid of said auxiliary turbine to the admission of said main turbine, a double-synchronous alternator coupled to said auxiliary turbine, a propeller, an electric motor operatively connected to said propeller, and means for electrically connecting said two alternators so that they deliver electric energy in parallel to said motor, said two alternators being electrically so proportioned as to establish a relation between the turbines whereby the auxiliary turbine operates at a higher speed than the main turbine.

2. An electric system of ship propulsion comprising a main elastic-fluid turbine, an alternating current generator coupled to said turbine, an auxiliary elastic-fluid turbine, means for supplying the exhaust fluid of said auxiliary turbine to the admission of said main turbine, a second alternating current generator coupled to said auxiliary turbine, said second alternating current generator being adapted for parallel operation with said first-mentioned generator when driven at double synchronism, a propeller, an electric motor operatively connected to said propeller, and means for electrically connecting said two generators so that they deliver electric energy in parallel to said motor, said two generators being electrically proportioned to establish a relation between the turbines whereby the auxiliary turbine operates at a higher speed than the main turbine.

3. An electric system of ship propulsion comprising a propeller, an electric motor operatively connected to said propeller, a main alternating current generator adapted to deliver electric energy to said motor, a main elastic-fluid turbine coupled to said generator, a double-synchronous alternating current generator also adapted to deliver electric energy to said motor, an auxiliary elastic-fluid turbine operatively connected to said double-synchronous generator, and means for supplying elastic-fluid to said main turbine while the auxiliary turbine remains operatively inactive for high speed navigation of the ship and for supplying the exhaust fluid of said auxiliary turbine to said main turbine and electrically connecting said generators in parallel whereby the main turbine runs at a lower speed than the auxiliary turbine and electric energy is supplied from both generators to said motor for navigating the ship at lower speeds.

4. An electric system of ship propulsion comprising a main elastic-fluid turbine, a synchronous alternating current generator coupled to said turbine, a double-synchronous alternating current generator, an auxiliary elastic-fluid turbine coupled to said double-synchronous generator, a propeller, an electric motor operatively connected to said propeller and adapted to receive electric energy from each of said generators, and means for operating said main turbine and said synchronous generator at their respective high speeds by admitting elastic fluid directly to the main turbine for high speed navigation of the ship and for operating said main turbine and said synchronous generator at relatively lower speeds by supplying the exhaust fluid of said auxiliary turbine to said main turbine and electrically connecting said generators in parallel for navigating the ship at relatively lower speeds.

In witness whereof I have hereunto set my hand this 21st day of March, 1916.

ERNST F. W. ALEXANDERSON